United States Patent
Van Overmeere et al.

(10) Patent No.: US 10,421,253 B2
(45) Date of Patent: Sep. 24, 2019

(54) POLYMER AEROGEL FOR WINDOW GLAZINGS

(71) Applicant: Palo Alto Research Center Incorporated, Palo Alto, CA (US)

(72) Inventors: Quentin L. Van Overmeere, Mountain View, CA (US); Gabriel Iftime, Dublin, CA (US); Farzaneh Afshinmanesh, Menlo Park, CA (US); Armin R. Volkel, Mountain View, CA (US); Bernard D. Casse, Saratoga, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 6 days.

(21) Appl. No.: 15/285,660

(22) Filed: Oct. 5, 2016

(65) Prior Publication Data

US 2018/0093456 A1    Apr. 5, 2018

(51) Int. Cl.
| | |
|---|---|
| *E06B 5/20* | (2006.01) |
| *B32B 17/06* | (2006.01) |
| *B32B 5/18* | (2006.01) |
| *B32B 7/12* | (2006.01) |

(52) U.S. Cl.
CPC .............. *B32B 17/066* (2013.01); *B32B 5/18* (2013.01); *B32B 7/12* (2013.01); *B32B 2250/02* (2013.01); *B32B 2255/102* (2013.01); *B32B 2266/0242* (2013.01); *B32B 2266/126* (2016.11); *B32B 2307/304* (2013.01); *B32B 2419/00* (2013.01); *B32B 2605/08* (2013.01); *Y02A 30/251* (2018.01); *Y02B 80/26* (2013.01)

(58) Field of Classification Search
CPC ......... B32B 17/00; B32B 17/066; B32B 5/18; B32B 7/12; B32B 2266/126; C08J 2205/026

See application file for complete search history.

(56) References Cited

U.S. PATENT DOCUMENTS

| 5,723,554 | A | * | 3/1998 | Fujita | ................ C08F 12/08 526/204 |
|---|---|---|---|---|---|
| 5,795,557 | A | | 8/1998 | Pajonk et al. | |
| 7,732,496 | B1 | * | 6/2010 | Leventis | ............. C04B 35/14 423/335 |
| 2010/0163157 | A1 | | 7/2010 | Milburn | |
| 2011/0311802 | A1 | * | 12/2011 | Cho | ................ B01J 13/0091 428/316.6 |

(Continued)

OTHER PUBLICATIONS

Jenkins et al., "Terminology for reversible-deactivation radical polymerization previously called 'controlled' radical or 'living' radical polymerization (IUPAC Recommendations 2010)," Pure Applied Chemistry, vol. 82, No. 2, pp. 483-491. 2010. (Year: 2010).*

(Continued)

*Primary Examiner* — Kara B Boyle
(74) *Attorney, Agent, or Firm* — Fay Sharpe LLP

(57) ABSTRACT

An energy efficient window includes a plate of glass having a first side and a second side opposite the first side. A polymer aerogel thermal barrier having a first side and a second side is further provided. One of the first side and the second side of the polymer aerogel thermal barrier is located on one of the first side and the second side of the plate glass.

9 Claims, 8 Drawing Sheets

(56) References Cited

U.S. PATENT DOCUMENTS

2014/0065329 A1* 3/2014 Showers .............. E06B 3/6715
428/34

OTHER PUBLICATIONS

Bemares et al., "Hildebrand and Hansen Solubility Parameters from Molecular Dynamics with Applications to Electronic Nose Polymer Sensor Polymers," Wiley Periodicals 2004. (Year: 2004).*
Graeme Mood et al., "A Micro Review of Reversible Addition/Fragmentation Chain Transfer (RAFT) Polymerization", Sigma-Aldrich, 8 pages.
Sebastien Perrier, "50th Anniversary Perspective: RAFT Polymerization—A User Guide", Macromolecules 2017, 50, pp. 7433-7447.
Vivek Mishra, "Living Radical Polymerization—A Review", Journal of Scientific Research, vol. 56, 2012, pp. 141-176.
"Reference: Polymer Properties", Polymer Products from Aldrich, pp. 46-49.
Aldrich, "Controlled Radical Polymerizaton Guide", 52 pages.

* cited by examiner

| 500 | PARC'S TRANSPARENT POLYMER AEROGEL | SILICA AEROGELS [ ] | POLYMER FOAMS [ ] | VACUUM-BASED THERMAL BARRIER [ ] |
|---|---|---|---|---|
| WINTER U FACTOR (Btu/h/ft$^2$/°F) | 0.26 | 0.26 | 0.310 | 0.25 |
| THERMAL CONDUCTIVITY (W/(m K)) | 0.010 | 0.012 | 0.015 | ~0 |
| CONDENSATION TEMPERATURE (°C) | -17.3 | -14 | -11 | -21 |
| VISIBLE TRANSMITTANCE OF PANE (°C) | >70 | 87.0 | <80[1] | 76[2] |
| HAZE OF PANE (%) | 1.0 | ~2.0 | >5[1] | 1.0 |
| TENSILE STRENGTH (MPa) | 0.9 | 0.016 | 1.5 | 19 |
| SERVICE LIFETIME (years)[3] | >20 | ~1 | >20 | 25 |
| COST OF PANE ($/ft$^2$) | ~9 | ~8 | ~9 | ~25 |

FIG. 5

POLYMER AEROGEL FOR WINDOW GLAZINGS

BACKGROUND

The present application is directed to window panes and more particularly to high-performance window panes and methods for forming high-performance window panes.

An approach to improving an existing single pane window's performance is to replace the entire window (frame, sash, and glazing) with a more modern window incorporating an advanced insulated glass unit (IGU). In addition to being double pane windows, IGUs also incorporate a low emissivity ("low-e") coating on at least one of the panes.

Emission of thermal radiation by an unimproved glass pane is a major source of heat loss. The low-e coating can reduce this loss. Additionally, filling the space between the panes with inert gases such as argon is intended to further improve IGU insulation by decreasing thermal conductance.

Despite these designs, single pane windows are being replaced by more advanced multi-pane windows fairly slowly in the United States and elsewhere. The cost of window replacement is one issue slowing down replacement; another is that the change in a building's appearance may preclude replacement of single pane windows by IGUs for esthetic and historical reasons (including location in an historical district), or due to homeowner association covenants. Still further, non-structural curtain walls of buildings are not constructed to support the additional weight of IGUs, which is typically more than double that of the single pane window which it would replace.

With regard to single pane window retrofits, these can be made with adhesive window films that modify the optical properties of existing single pane windows both in buildings and vehicles. These adhesives typically include a low-e coating. However interior condensation resistance is diminished by the low-e layer. What is meant by interior condensation resistance is that, everything else being equal, the low-e layer effectively decreases the temperature of the pane, resulting in condensation on the pane at higher outdoor temperatures than without low-e layer. Condensation also affects emissivity, and interior surface low-e layers are most effective on windows without condensation.

Exterior storm windows can improve the efficiency of a single pane window. With the addition of a low-e coating they can be nearly as efficient as an IGU. Disadvantages of the exterior storm windows are their change to the exterior appearance of a building, and interference with opening and closing of existing windows, as well as cost.

Interior panels that are sealed against the existing window frame are also believed to be less expensive than full replacement, and attempt to duplicate qualities of IGUs for soundproofing, comfort, and efficiency. They may however interfere with the operation of the original window and with existing shades, have issues with cold-weather condensation of water, and also have appearance and cost issues.

Certain alternative window panes employ silica aerogels in sealed pane assemblies (i.e., where aerogels are synthetic porous ultralight materials derived from a gel, where the liquid component of the gel has been replaced with a gas). However, these are expected to share similar drawbacks with IGUs due to the need to use a seal for prevention of water adsorption and mechanical damage to the silica aerogel in consideration of its low tensile strength, among other drawbacks.

In view of the issues of existing and proposed window panes and installations, it is considered useful to develop and manufacture improved single pane windows.

BRIEF DESCRIPTION

An energy efficient single pane window includes a plate of glass having a first side and a second side opposite the first side. A polymer aerogel thermal barrier having a first side and a second side opposite each other is further provided. One of the first side and the second side of the polymer aerogel thermal barrier is located on one of the first side and the second side of the plate glass.

The window pane with a polymer aerogel thermal barrier further includes a low emissivity (low-e) coating located over at least one of the first side or second side of the polymer aerogel thermal barrier.

The window pane with a polymer aerogel thermal barrier further includes a low emissivity (low-e) coating located over at least one of the first side or the second side of the plate of glass.

The window pane with a polymer aerogel thermal barrier includes the plate of glass being one of a substantially flat plate of glass and a curved plate of glass, configured for use as a window in a building structure or a vehicle structure.

The window pane with a polymer aerogel thermal barrier includes the polymer aerogel thermal barrier configured to include a plurality of pores having pore sizes less than or equal to approximately 50 nm or less and an overall porosity of equal to approximately 70% or greater.

The window pane with a polymer aerogel thermal barrier includes the polymer aerogel thermal barrier configured to have a thermal conductivity in a range of approximately 0.010 W/(m K) to approximately 0.020 W/(m K).

The window pane with the polymer aerogel thermal barrier and optional low-e coating result in a winter U-factor of the pane in a range of approximately 0.50 Btu/h/ft$^2$/° F. to approximately 0.26 Btu/h/ft$^2$/° F.

The window pane with a polymer aerogel thermal barrier includes a visible transmittance of the polymer aerogel thermal barrier in a range of approximately 70% to approximately 97%.

The window pane with a polymer aerogel thermal barrier includes a haze of the polymer aerogel thermal barrier equal to approximately 2% or less.

The window pane with a polymer aerogel thermal barrier includes a tensile strength of the polymer aerogel thermal barrier of approximately equal to 0.1 MPa or greater.

The window pane with a polymer aerogel thermal barrier includes a service lifetime of the window pane equal to or greater than 20 years.

An energy efficient window pane is formed by providing a plate of glass having a first side and a second side; forming a polymer aerogel thermal barrier having a first side and a second side; and associating at least one of the first side and the second side of the polymer aerogel thermal barrier with at least one of the first side and the second side of the plate of glass.

The forming of the window pane with the polymer aerogel includes forming of the polymer aerogel thermal barrier by mixing at least one transparent monomer, liquid solvent and at least one cross-linker in a solution; performing polymerization on the solution, wherein the polymer and the liquid solvent are separated; and drying the liquid solvent separated from the polymer, wherein the liquid solvent is removed.

The polymer aerogel may be formed via a living radical polymerization (e.g., atom-transfer radical polymerization, reversible addition-fragmentation chain-transfer polymerization, and stable free radical polymerization using stable nitroxide radicals).

The polymer aerogel may be formed by polymerizing a set of monomers and cross-linkers in at least one solvent wherein the Hildebrand solubility parameter of the monomers and at least one solvent is greater than 10 $(cal/cm^3)^{1/2}$ and the difference between the solubility parameter of (a) the monomers and crosslinkers; and (b) the solvents is less than 1 $(cal/cm^3)^{1/2}$.

The aerogel may be rendered hydrophobic by treatment with chloro trimethyl silane and higher hydrocarbon substituted chloro silane analogues.

Aerogel formation may be activated by heating at least one initiator selected from the group consisting of benzoyl peroxide, diacetylperoxide, di-t-butylperoxide, cumyl peroxide, AIBN, and phenylazotriphenylmethane.

The at least one monomer and the at least one crosslinker may be selected from the group consisting of single- or multi-functional acrylates, methacrylates and vinyl groups.

BRIEF DESCRIPTION OF THE DRAWINGS

FIG. 5 is a table showing comparison of performance of the present technology and alternative technologies;

DETAILED DESCRIPTION

The present disclosure is directed to single pane windows that are energy-efficient, resistant to condensation on their inner surfaces and able to sustain a large thermal gradient. Such single pane windows are constructed to avoid issues of existing window configurations such as high cost, low durability, excessive weight and lack of reliability. The present single pane windows can be designed for original use as well as to be installed in existing sashes. These panes decrease the heat flux through the window (e.g., by approximately 3×) compared to existing single pane windows.

For the present single pane windows theoretical and numerical analyses reveal that particular consideration is to employ a thermal barrier material having low thermal conductivity and high optical-transparency. The thermal barrier is a factor that can reduce a window's U-factor—which measures the rate of heat transfer (or loss)—by substantial amounts including up to 50% or more. Low-e, or other coating types, are important but remain secondary. Nonetheless, low-e coatings still provide an additional (e.g., about 10%) drop in U-factor.

Figure 1:
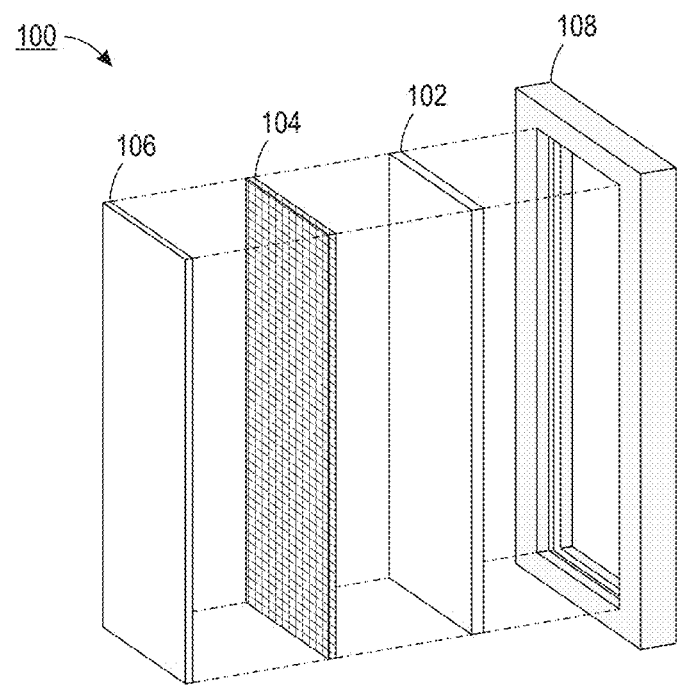
FIG. 1 is an architecture of a window pane including a float glass, a transparent thermal barrier and an acrylic adhesive layer with a low emissivity coating.

Turning to FIG. 1 illustrated is an embodiment of a single pane window architecture 100 according to the present application. Included is a ⅛" thick float glass 102, a ⅛" thick polymer aerogel transparent thermal barrier 104, a layer (e.g., acrylic) functionalized with a low-emissivity (low-e) coating 106, and a sash or frame 108. While the thickness of the float glass and the polymer aerogel transparent thermal barrier are each described as having a thickness of being ⅛", it is understood the present teachings are not limited to these thicknesses.

In certain embodiments the polymer aerogel transparent thermal barrier 104 includes a synthesized polymer aerogel with pores sized at less than or equal to about 50 nm and approximately 70% to approximately 97% porosity, including approximately 80% to about 95% porosity. In some embodiments, the aerogel pores have pore sizes of approximately 10 nm to approximately 8 nm (or less). The polymer aerogel thermal barrier 104 is synthesized with colorless monomers (e.g., selected from among acrylate, polyacrylate esters, urethane, epoxies, as well as others) to lower or eliminate light absorption by the polymer aerogel. The polymer aerogel also exhibits a thermal conductivity in a range from approximately 0.010 to approximately 0.020 W/(m K), including from approximately 0.016 to approximately 0.010 W/(m K) (in certain embodiments ~0.012 W/(m K)), a haze (measured consistently with ASTM D1003 using CIE illuminant C on a ⅛"-thick specimen) equal to approximately 2% or less (including 1% or less), visible transmittance of approximately 70% to approximately 97% including approximately 80% to approximately 95% (in certain embodiments ~90%) and a color rendering index (Ra) equal to approximately 0.8 or greater (including 0.9 or greater).

The polymer aerogel thermal barrier 104 enables a reduction in the U-factor—which measures the rate of heat transfer (or loss)—of the single pane window (e.g., of up to 50% or greater in some embodiments) compared to existing single pane windows. The single pane window may have a winter U-factor in a range of less than approximately 0.50 $Btu/ft^2/h/F$ to approximately 0.26 $Btu/ft^2/h/° F.$ (in certain embodiments ~0.32 $Btu/ft^2/h/F$), and an exterior temperature for inside condensation of center-of-glass of approximately −15° C. to −45° C. (in certain embodiments ~−17.3° C.).

In certain embodiments, the transparent polymer aerogel thermal barrier exhibits:

1. a thermal conductivity lower than 0.016 W/(m K). For a ⅛"-thick barrier, this allows the winter U-factor of the windowpane to be less than 0.4 $Btu/ft^2/h/° F.$ and exterior temperature for interior condensation to be less than −10° C.;
2. a visible transmittance or transparency greater than 89%. This allows the visible transmittance of the final windowpane to be higher than 80%. Its haze is lower than 1% and its color rendering index Ra is greater than 0.9;
3. mechanical robustness to survive pane deformation due to wind or user-generated loads; and
4. properties that are not degraded by exposure to solar radiation, temperature, and humidity cycles for 20 years or more.

Prior to the present disclosure no material or system was understood to be capable of meeting the above properties, as such properties involve competing material property characteristics. For example, thermal conductivities lower than 0.050 W/(m K) require porosity, which in turn scatters light, yields brittle material, and gives rise to large surface areas that increase interactions with ambient molecules, resulting in degradation of optical properties. A typical example is silica aerogel. Although highly transparent (>97%), silica aerogel monoliths with low thermal conductivities (<0.014 W/(m K) in air at 20° C.) have been demonstrated, their low tensile strength (~0.016-0.020 MPa) and long-term degradation of optical properties upon water adsorption make them generally unsuitable for application as transparent thermal barriers, such as for single pane window architectures.

A polymer aerogel thermal barrier, such as barrier 104 uses a polymer backbone instead of, for example, the fragile backbone of silica aerogel, leading to a 40 to 50 times or more increase of the tensile strength (e.g., 0.016 MPa for silica aerogel to approximately 0.9 MPa for polymer aerogel). Also the polymer aerogel barrier 104 is constructed to have a substantially uniform pore size distribution throughout the body of the barrier in some embodiments. In addition, a thermal conductivity of transparent polymers being significantly lower than other materials (e.g., silica), this leads to a thermal conductivity of the polymer aerogel in the range of approximately 0.010 W/(m K) to approximately 0.020 W/(m K) including approximately 0.010 to approximately 0.012 W/(m K) (where thermal conductivity becomes lower as uniformity of distribution increases and thermal conductivity of the backbone decreases), at ambient temperatures.

Figure 2:
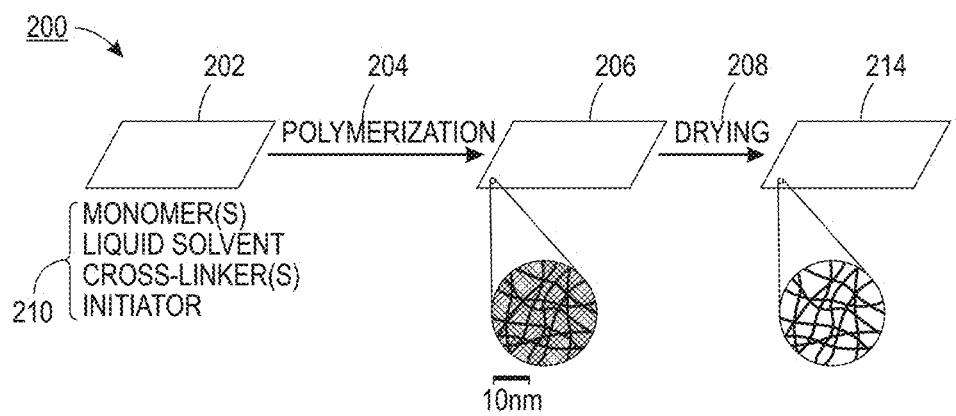
FIG. 2 illustrates a synthesis of the polymer aerogel.

A view of the synthesizing of polymer aerogel according to the present application is illustrated in view 200 of FIG. 2. Provided is a precursor mixture 202 of transparent monomer formulations that do not absorb visible light, a liquid solvent, cross-linkers (added to strengthen the polymer) and radical initiators. The aerogel cross-linked network is formed in-situ by polymerization of monomers and cross-linkers initiated by radicals produced by activation of initiators, all dissolved in a solvent. During a polymerization step 204, a solid polymer structure is formed and the liquid solvent phases separate 206. Then a drying (solvent removal) step 208 is undertaken to solidify the material. As noted, the polymer aerogel is made mechanically robust by adding appropriate cross-linkers, where such robustness is needed to ensure the porous network does not collapse during the drying step. The synthesis conditions (208, 204, 212) determine the polymer morphology which in turn affects the properties of the formed polymer aerogel thermal barrier 214.

In certain embodiments of the present disclosure the pore sizes (e.g., ~10 nm to ~8 nm or less) are realized by identifying the appropriate porogen solvents, monomers, cross-linkers and initiator chemistries and optimizing the processing conditions. In other embodiments, the pore sizes are less than about 50 nm.

For the purpose of this application monomers and cross-linker molecules contain reactive, i.e. polymerizable functional groups that form polymer chains by chain-growth polymerization. The difference between monomers and cross-linkers consists in the number of polymerizable groups. For the purpose of this application, monomers contain one or two polymerizing groups while cross-linkers possess three or more polymerizing groups. Preferred monomers are those which have limited or no water compatibility, therefore producing water-insoluble cross-linked aerogels after polymerization. Suitable monomers include monomers containing polymerizable double bonds including acrylates, methacrylates or vinyl monomers. Examples of suitable acrylates and methacrylates include (a) monofunctional acrylates and methacrylates such as methyl acrylate, ethyl acrylate, methyl methacrylate, ethyl methacrylate, benzyl methacrylate, lauryl methacrylate, isobornyl methacrylate (b) difunctional acrylates and methacrylates such as 1,3-Butanediol diacrylate, 1,6-hexanediol diacrylate, bisphenol A ethoxylate diacrylate, ethylene glycol diacrylate, poly (ethylene glycol) diacrylate. Suitable vinyl monomers include styrene, divinylbenzene and liquid ethylene derivatives such as, vinyl stearate, vinyl laurate, vinyl benzoate, vinyl acetate, ethyl vinyl ether, vinyl chloride, 1-Vinyl-2-pyrrolidone. Chemical formulas for some of these monomers are provided below.

Monomers—Representative Examples

Mono-functional acrylates and methacrylates

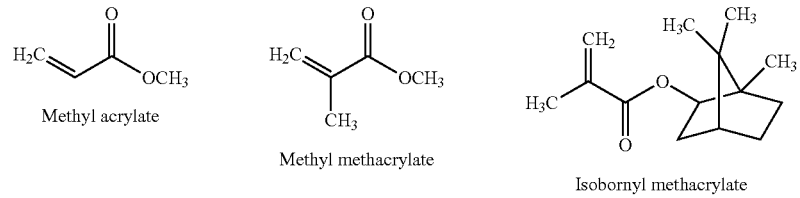

Methyl acrylate

Methyl methacrylate

Isobornyl methacrylate

Di-functional acrylates and methacrylates

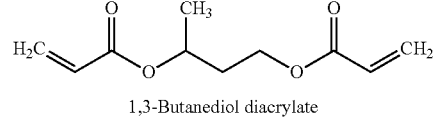

1,3-Butanediol diacrylate

-continued

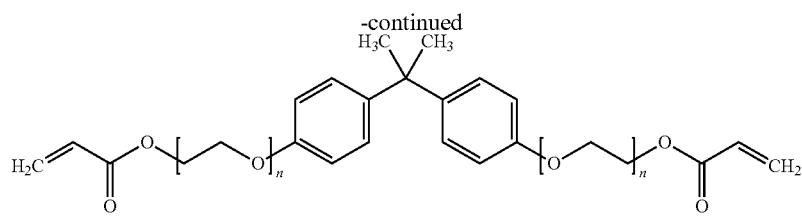

Bisphenol A ethoxylate diacrylate

Vinyl monomers

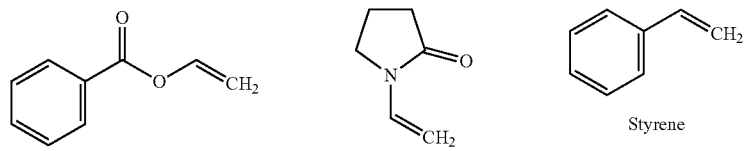

Vinyl benzoate     1-Vinyl-2-pyrrolidinone     Styrene

Suitable cross-linkers include tri, tetra, penta or hexa-acrylates and methacrylates such as trimethylolpropane triacrylate, trimethylolpropane ethoxylate triacrylate, di(trimethylolpropane) tetraacrylate, dipentaerythritol penta-/hexaacrylate. Chemical formulas for these examples of cross-linkers are provided below.

Cross-linkers

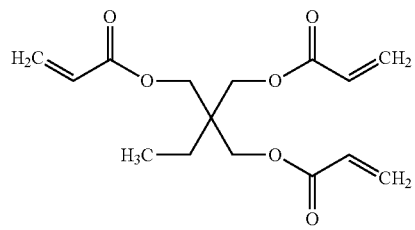

Trimethylolpropane triacrylate

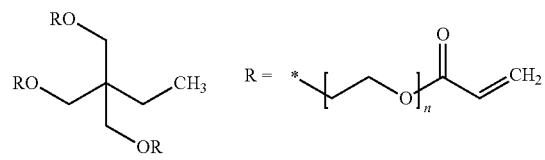

Trimethylolpropane ethoxylate triacrylate

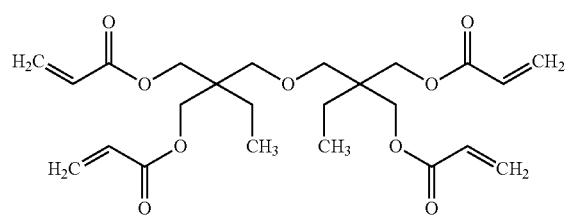

Di(trimethylolpropane) tetraacrylate

-continued

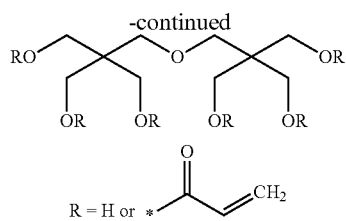

R = H or *

Dipentaerythritol penta-/hexa-acrylate

A porogen is a solvent present in large percentage (from about 50% to about 99%). The porogen solvent dissolves the reactive monomers, cross-linkers and initiator molecules and acts as a template to create the solvent filled-voids in the gel structure during polymerization, that become pores after solvent removal. Suitable porogen solvents provide good solubility to the reactive monomers. Non-limiting examples of suitable solvents include N-methylpyrrolidine, dimethylformamide, methyl ethyl ketone, toluene, tetrahydrofuran, diethyl ether, diglyme (diethylene glycol dimethyl ether), 1,2-dimethoxy-ethane, ethyl acetate, xylene and others.

Suitable radical initiators include thermal initiators—activated by heat—and photoinitiators which are activated by light, typically Ultra Violet in a range of about 200 nm to 400 nm wavelength. Non-limiting examples of thermal initiators includes (a) peroxides such as benzoyl peroxide, diacetylperoxide, di t-butylperoxide, cumyl peroxide; or azo compounds such as AIBN and Phenylazotriphenylmethane. Non-limiting examples of photoinitiators include benzophenone, benzyl, benzoin and the like. Chemical formulas for some of these examples of initiators are provided below.

Thermal initiators

Peroxides

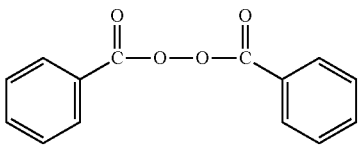

Benzoyl peroxide

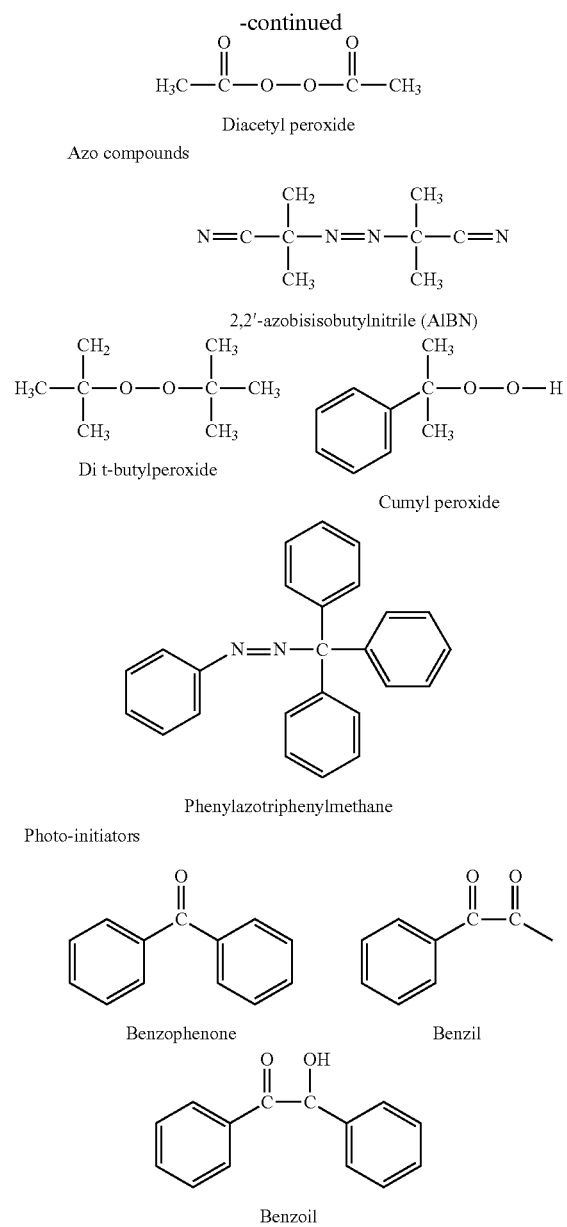

The average pore size of the aerogel fabricated in some embodiments of the present disclosure is in the range from about 2 nm to about 50 nm, more preferably from about 3 nm to about 20 nm, and including from about 5 nm to about 8 nm. The width of the pore size distribution is defined as the symmetric span around the most probable pore size needed to include at least 95% of the pore volume.

While the overall porosity of polymer aerogel is determined by the fraction of monomer in the precursor mixture, controlling the pore size and narrow width of the pore size distribution is much more difficult to achieve. The formed solid polymer networks may result from the polymerization of the monomers precipitated out from the solvent and as a result the polymerization process stops before consumption of the entire amount of monomers/cross-linker materials. The remaining radical chains still present in the solution initiate a secondary and uncontrolled polymer chain growth resulting in uncontrolled new polymer chain lengths and therefore pore size. Most of these new chains are separate from the main cross-linked polymer network and are removed by solvent washing during the solvent processing of the aerogel. The net result is a wide particle pore size distribution and generally large pore size overall. Within some embodiments, the aerogels are fabricated with a narrower pore size distribution by: (a) by choosing monomers that produce polymers that are highly compatible with the solvent; and/or (b) inducing uniform polymer chain growth in the bulk of the aerogel, by "living" polymerization.

(a) Highly compatible solvent/aerogel wall polymer: By inducing the formation of polymers that are highly compatible with the solvent, the formed cross-linked polymer chains do not precipitate out from the solvent, allowing a more uniform pore growth in the bulk of the aerogel until polymerization completion, eliminating secondary polymerization processes, unlike traditional polymer aerogels. One approach to define the solvating power of the solvent in relationship to the polymer chain is by using the solubility parameters. The Hildebrand solubility parameter ($\delta$) provides a numerical estimate of the degree of interaction between materials, and can be a good indication of solubility, particularly for nonpolar materials such as many of the monomers and polymers used for the fabrication of the aerogel in accordance with some embodiments of the present disclosure. Hildebrand solubility parameters for organic solvents are defined in a similar way. Polymers that have similar values to the solubility parameters of the selected solvents are expected to be soluble in the respective solvent. The selection of aerogel polymer materials and solvent with similar values of $\delta$ increase the likelihood of miscibility. Extensive tables with the Hildebrand solubility parameters of polymers and organic solvents are known to people having ordinary skill in the art. See "Polymer Handbook", Eds. Brandrup, J.; Immergut, E. H.; Grulke, E. A., $4^{th}$ Edition, John Wiley, New York, 1999, VII and Sigma Aldrich (https://www.sigmaaldrich.com/content/dam/sigma-aldrich/docs/Aldrich/General_Information/polymer_solutions.pdf), the contents of which are incorporated by reference herein.

Unlike single chain polymers, the polymeric structures created in this aerogel have a cross-linked structure, i.e. thermoset. Thermoset polymers do not fully solubilize in compatible solvents, they just swell. In the swollen state the solvent and the formed polymer are compatible and there is no significant polymer precipitation out of the solvent.

The Hildebrand solubility parameter ($\delta$) expressed in $(cal/cm^3)^{1/2}$ ranges from about 7.3 (very non polar materials and solvents such as hexane) to about 23.5 for water. The design rule for the selection of suitable pairs of monomers/cross-linkers and solvents for creation of compatible polymer/solvent structures that results in small and narrow pore size distribution is as follows: the difference between the solubility parameters of the formed polymer and the solvent is smaller than 2 $(cal/cm^3)^{1/2}$, preferably smaller than 1 $(cal/cm^3)^{1/2}$. In most cases the solubility parameter of the monomer is very close to the value of the formed polymer. Therefore as a simple and practical design rule, the difference between the solubility parameters of the monomer and the solvent is smaller than 1 $(cal/cm^3)^{1/2}$.

The benefit of using the solubility parameters is that they can be averaged for mixtures of solvents and mixtures of polymer chain (copolymers) respectively, based on the values of the individual components. The composition can then be finely tuned by using more than one solvent to meet the compatibility relationship ($\Delta\delta$ (solvent mixture–polymer mixture)<1 $cal/cm^3)^{1/2}$.

(b) Living polymerization: Even with fully miscible materials systems, traditional radical polymerization initiated by radical initiators such as benzoyl peroxide shows poor chain length control, that may result in aerogels with sub-optimal pore size control, i.e. large width of the pore size distribution, therefore large haze. In the traditional "living radical polymerization" process, the polymer chains formation is initiated at the same time in the bulk of the polymer batch, therefore produce uniform polymer chain length. When applied to polymer aerogel fabrication, this provides a narrower pore distribution, enabling polymer aerogels with low haze. Several "living" radical polymerization techniques are known to those skilled in the area of "living" radical polymerization and can be extended to fabrication of aerogels with narrow pore size distribution proposed in the present disclosure including: atom-transfer radical-polymerization (ATRP), reversible addition-fragmentation chain-transfer polymerization (RAFT), and stable free radical polymerization (SFRP).

Some non-limiting examples of ATRP are described in U.S. Pat. Nos. 5,763,548 and 5,807,937, the contents of which are incorporated by reference herein in their entireties.

Some non-limiting examples of RAFT are described in U.S. Pat. No. 7,714,075, the contents of which are incorporated by reference herein in its entirety.

Some non-limiting examples of SFRP are described in U.S. Pat. Nos. 5,412,047, 5,449,724, and 6,258,911, the contents of which are incorporated by reference herein in their entireties.

These techniques have not previously been used for fabrication of aerogels with controlled pore size and size distribution.

While not being limiting drying step 204 of FIG. 2 may be implemented in ambient conditions or by supercritical drying. In certain embodiments ambient drying is used to avoid safety and scale-up concerns which may be issues if supercritical drying is employed. However, air drying for solvent removal of aerogels typically results in aerogel collapsing. This is particularly a problem in the case of relatively polar solvents (a solubility parameter >10), which are compatible with most acrylate and methacrylate functional polymers used for the fabrication of the polymer aerogel structure. Polar solvents with relatively high surface tension and solubility parameters >10 are generally beneficial because they are key to keep in place the formed polymer network gel. However, once the solvent is removed, the polar groups present onto the crosslinked polymer chains forming the aerogel network are forced to aggregate through polar interactions, with the net result of a collapsed aerogel. In order to enable solvent removal without structure destruction, the surface tension of the polymer materials may be decreased. The most efficient approach is to transform the aerogel structure into a more hydrophobic structure. This has been done successfully by reacting the active hydrogen containing groups with chloro trimethyl silane (TMSCI). With this treatment, the —OH groups exposed on the polymer backbone surface are replaced with —OSi(CH$_3$)$_3$ groups from TMSCI to make the aerogels hydrophobic. See T.-Y. wei et al, *J. Phys. Chem. B* 2008, 112, 11881-11886 and reference #21 therein, the contents of which are incorporated by reference herein. Further solvent exchange to a more non polar solvent (such as hexane) creates a structure where only weak interaction between the solvent and crosslinked robust aerogel polymer exist at this moment. Therefore solvent evaporation without aerogel structure collapse becomes possible.

Optimization of both the polymerization and the drying steps, may include identifying the synthesis conditions leading to low haze values. This can be done by rigorous design of experiments. Design of experiments is useful because the sensitivity to processing conditions are large. For instance, the dependence of pore size on a porogen solvent composition can be non-monotonic.

While not being limiting, the polymer aerogel produced using the above recipe can then be i) integrated on float glass using acrylate-based adhesive films ii) integrated on a low-emissivity (low e) coated float glass using acrylate-based adhesive films iii) integrated on float glass using acrylate-based adhesive films and covered by an additional polymer film, or glass pane with or without a low-e coating.

Figure 3:
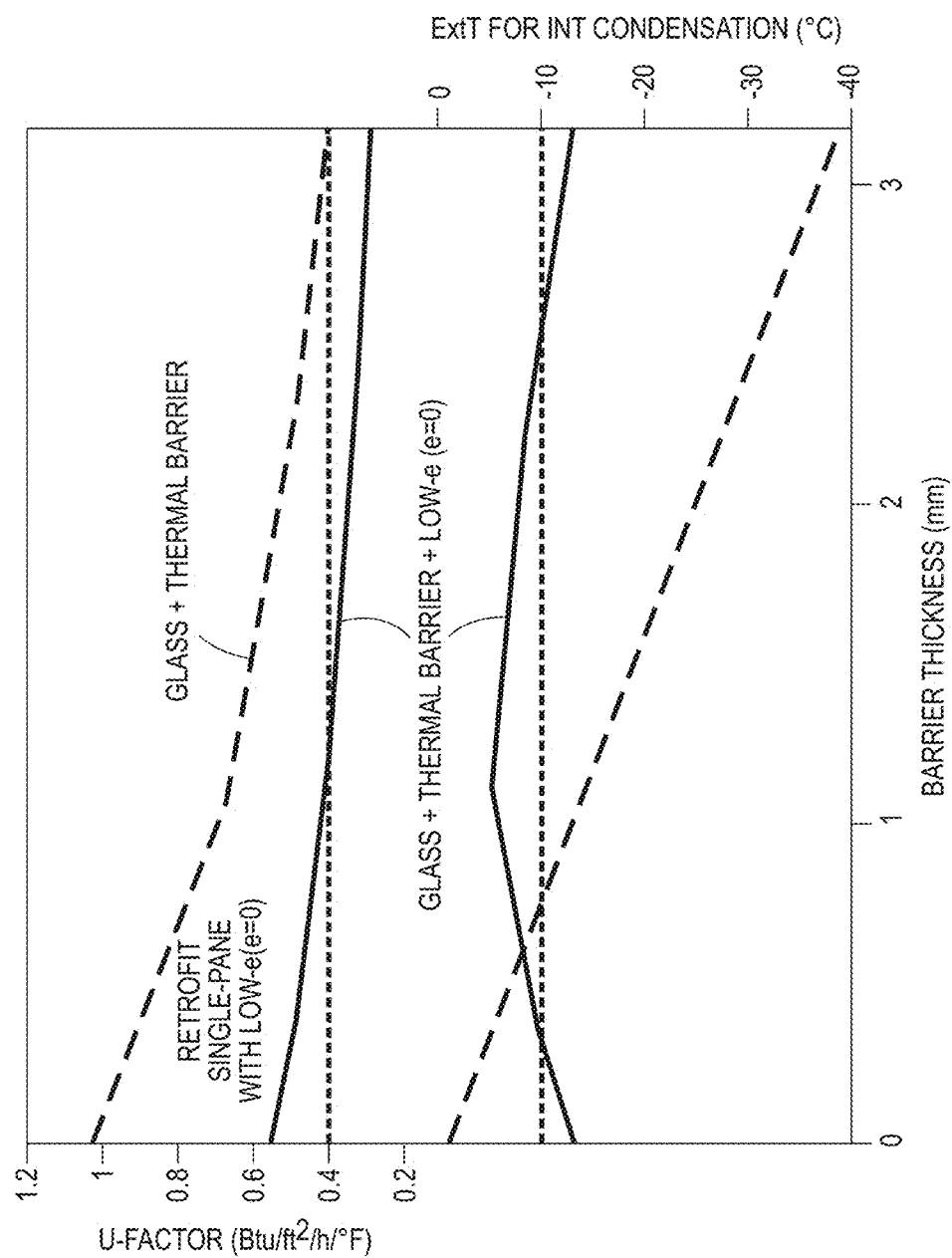
FIG. 3 illustrates a chart of condensation temperature affecting user comfort.

As described above, to achieve highly insulating single pane window architectures a transparent thermal barrier (e.g., 104 of FIG. 1) is employed. Improved low-e or other coatings without the thermal barrier 104 would not lead to significant performance improvements without sacrificing user comfort metrics such as condensation temperature, as illustrated in FIG. 3.

Figure 4:
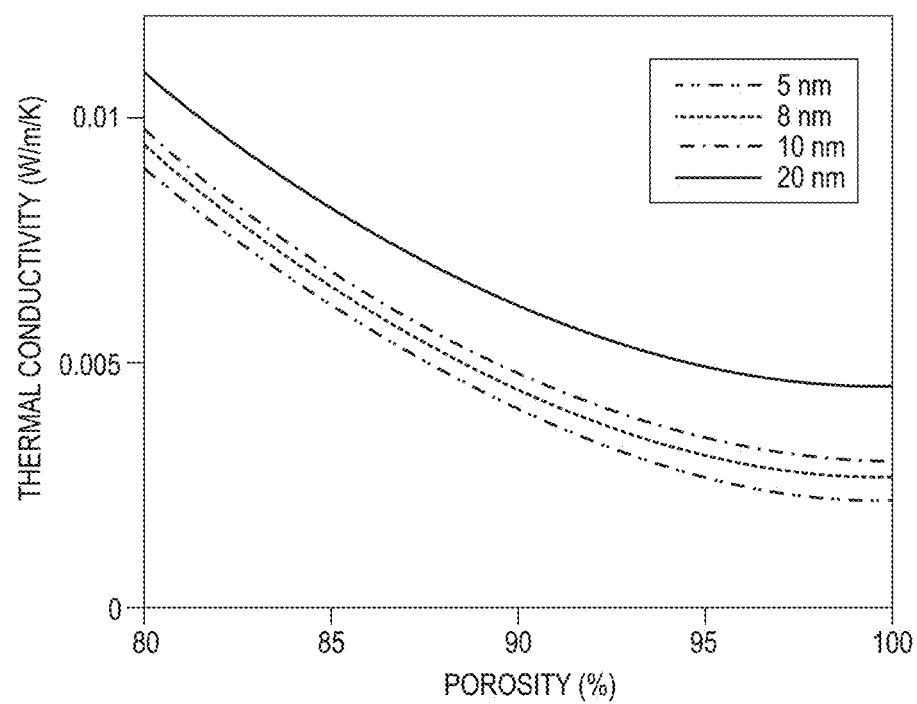
FIG. 4 is a graph of polymer aerogel versus porosity and pore size based on modeling operations.

From the foregoing, it is understood the present teachings employ an approach to lower thermal conductivity which consists of using highly porous materials. This is effective as increasing the porosity decreases the relative amount of heat transported by the solid relative to gas filling the pores. Furthermore for pore sizes smaller than the mean free path of gas molecules (~80 nm for air at ambient conditions), the effective thermal conductivity of the gas phase decreases as described by the Knudsen effect. Thus, as pores smaller than 50 nm and porosities larger than 70% are obtained lower thermal conductivities are achieved, as shown in the calculated values of FIG. 4.

Aerogel synthesis produces porosity in a template-free bottom-up approach, which is more economic than template-based top-down approaches. This is why, as mentioned in the Background, silica aerogels have been explored for use in windowpanes. In these windowpanes, the silica aerogels are however either in the form of translucent beads or transparent monoliths. Increasing the transparency of silica aerogel monoliths for window applications has been pursued. Currently, the best performing silica aerogel monoliths documented for window applications still suffer from haze values larger than float glass. Recent developments in the synthesis of silica aerogel monoliths used in nuclear physics, where scattering of photons has to be minimized for efficient particle detection, are promising. Haze values for ⅛"-thick specimens as low as 2.4% have been obtained, suggesting the possibility of achieving useful pore size distribution for highly transparent low-haze silica aerogels. However, monolithic silica aerogels are brittle and moisture-sensitive. They are therefore encapsulated in an inert gas or in vacuum and only considered in multiple pane window architectures and are not formed as self-standing configurations (e.g., polymer aerogel thermal barrier 104 of FIG. 1).

Turning to FIG. 5, shown is a table 500, which compares theoretical performance of different porous materials which are considered as thermal barriers for window pane architectures, including the transparent polymer aerogel of the present disclosure. U-factor and condensation temperature at the center of the simulated single panes in table 500 were calculated using Lawrence Berkeley National Laboratory's (LBNL) WINDOW software.

The alternative approaches (i.e., other than polymer aerogel), exemplified but nor restricted to those in table 500 of FIG. 5 are considered to have limitations when attempting to be used for transparent thermal barriers, as they are considered to lack the potential for full scale manufacturing. For instance the processing of ultra-low thermal conductivity non-porous $WSe_2$ crystals, is inherently limited to sub-micrometer thickness or relatively small sample sizes, showing little opportunity for integration into windows.

Figure 6A:
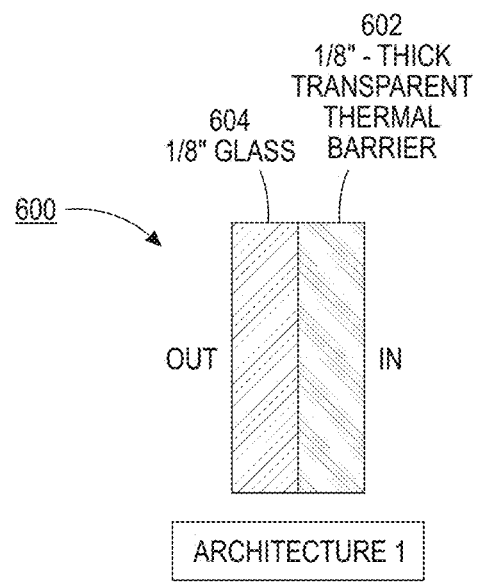
FIG. 6A illustrates a glass panel with a transparent thermal barrier according the present application.
Figure 6B:
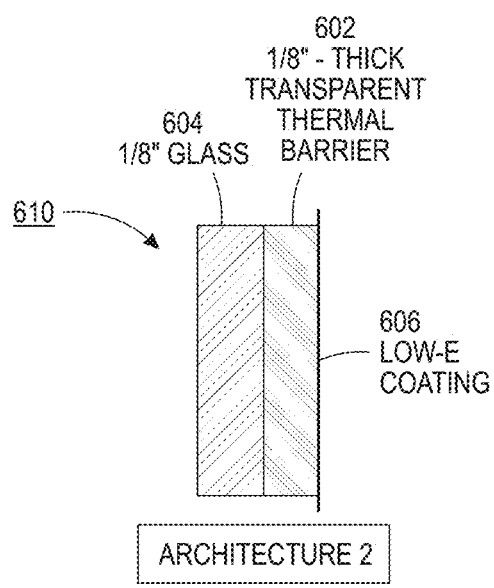
FIG. 6B illustrates an embodiment of a glass panel, transparent thermal barrier and a low-e coating according to the present application.
Figure 6C:
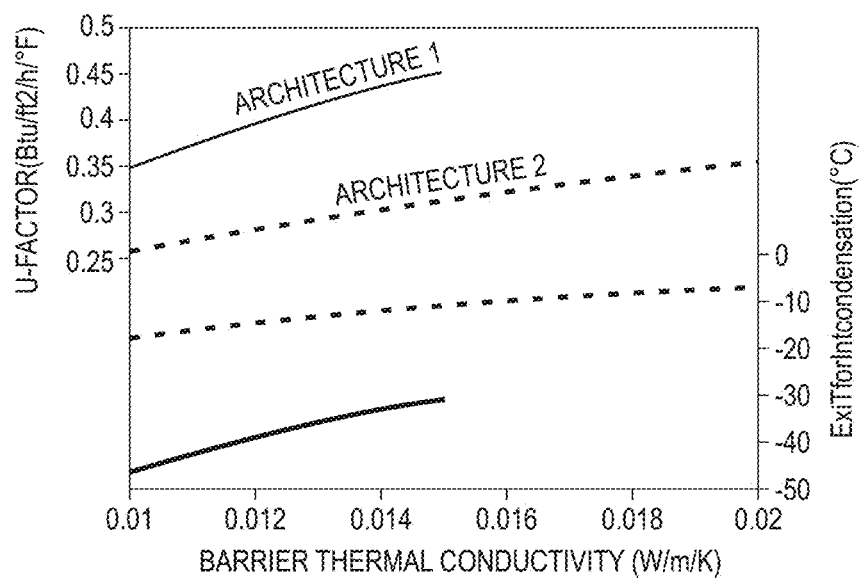
FIG. 6C is a chart of thermal conductivity (W/(m K)) of the thermal barrier versus the U-factor $(Btu/ft^2/h/° F.)$.

Turning to FIG. 6A depicted is an embodiment of a single pane window architecture 600; FIG. 6B illustrates another embodiment of a single pane window architecture 610; and FIG. 6C illustrates a U-factor chart 620 for the single pane window architectures of FIGS. 6A and 6B.

In the architecture 600 of FIG. 6A, a 1/32" to 1/8" thick transparent polymer aerogel thermal barrier 602 is applied directly on a 1/8"-thick glass 604. This architecture is advantageous because it consists of only two components: the polymer aerogel thermal barrier 602 and the float glass 604, and is therefore low-cost. With a porous polymer aerogel thermal barrier 602 sufficiently transparent to IR radiation, a low-e coating 606 on the glass 604 surface acts to lower the U-factor further. For example, a 1/8" thick 95% porous Poly(methylmethacrylate) (PMMA) aerogel which has an IR transparency of ~20% will benefit from a low-e coating on the float glass. Turning to FIG. 6B, the low-e coating, if integrated as an adhesive film on the aerogel surface acts as a protective cover to the polymer aerogel, which would be preferred in some cases, e.g., if it turns out that its resistance to abrasion is too low. As seen from FIG. 6C, the low-e coating decreases the U-factor.

Depending on the glass pane architecture selected, the low-e coating is deposited either on the float glass or on a polymer film applied onto the transparent thermal barrier. Typical low-e hard coats are compatible with the former architecture, their typical emissivity is less than approximately 0.1 and visible transmittance can be larger than 90% when anti-reflection coatings are included (e.g. Pilkington Energy Advantage glass). If the latter windowpane architecture is selected, a commercially available low-e coating on a polymer substrate is used. Performance metrics for such polymer-supported films are 0.09 emissivity and 68% visible transmittance (e.g. Solargard Ecolux 70). Regarding adhesive layers, transparent acrylic adhesive layers such as 3M's Optically Clear Adhesives are also commercially available (e.g., 8211, 8212, 8213, 8214, and 8215) with transparencies greater than approximately 99%, haze less than approximately 0.5% and are colorless.

It is noted the architecture 600 of FIG. 6A satisfies the winter U-factor metric without a low-e coating, when a polymer aerogel with thermal conductivity lower than 0.012 W/(m K) is synthesized.

Figure 6D:
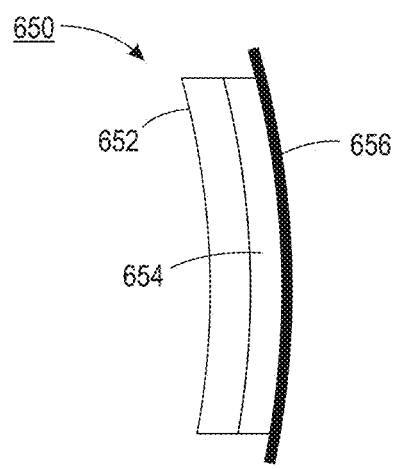
FIG. 6D illustrates an embodiment of a curved glass panel, transparent thermal barrier and a low-e coating according to the present application.

FIG. 6D illustrates a single pane window 650 having the characteristics of FIGS. 6A and/or 6B but where the plate glass 652, and therefore the polymer aerogel thermal barrier 654 and optional low-e coating 656, are manufactured in a curved form, which may be used in buildings as well as vehicle installations.

Next, how the pore size and porosity affect haze is quantified. Rayleigh scattering is responsible for low direct transparency of aerogels mainly between 400-500 nm wavelengths. The direct transmission (Tdirect) of silica aerogels is usually fitted to: Tdirect=A exp I(−CL/$\lambda 4$), where A is a sample-dependent constant, C is the clarity coefficient, L is the aerogel thickness and $\lambda$ is wavelength. An ideal transparent aerogel would have A=1 and C=0. The most transparent silica aerogel reported to date has A=1 and C=0.00533 $\mu m4/cm$. Calculations show that these coefficients correspond to a visible transmittance of 97.6% and haze of 2.4%, as defined in ASTM standard D1003 (illuminant C). For the present disclosure the requirements on pore size were assessed in order to obtain haze-free polymer aerogels, employing analytical formulations for Rayleigh scattering.

Figure 7:
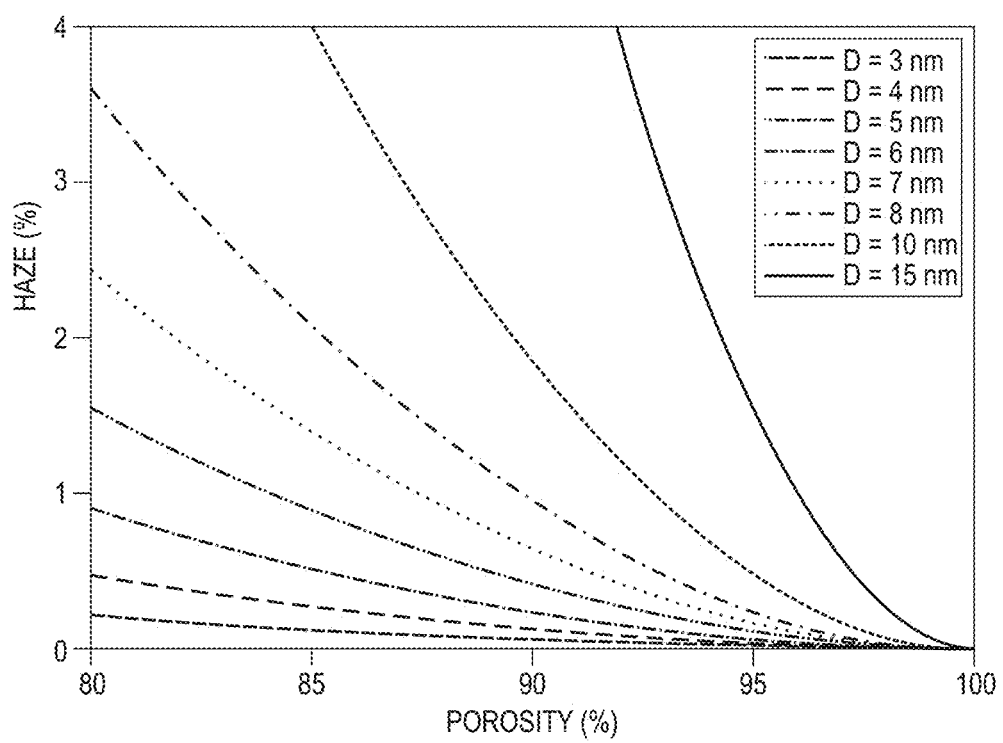
FIG. 7 is a chart of haze (illuminant-C) versus PMMA aerogel pore size and porosity.
Figure 8:
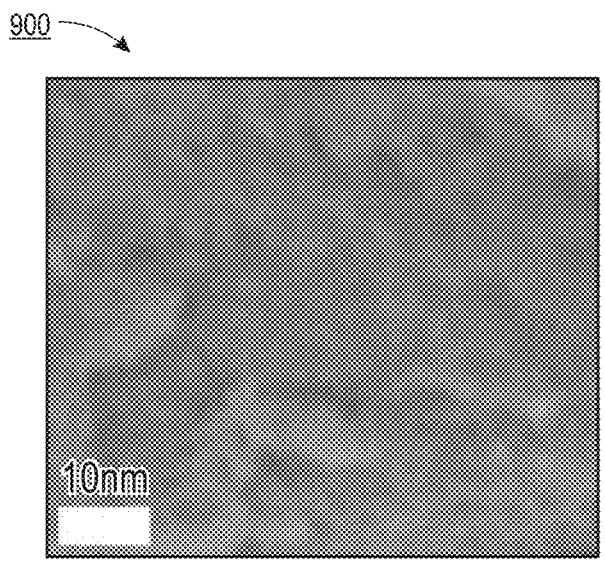
FIG. 8 is a scanning electron micrograph for a polymer aerogel prototype, the pore size being approximately 30 nm.

The calculated pore size to achieve a given haze value is shown in graph 700 of FIG. 7. Where haze is understood to be the "scattering of light by a specimen responsible for the reduction in contrasts of objects viewed through it, quantified as the amount of transmitted light that is scattered so that its direction deviates more than a specified angle from the direction of the incident beam, typically 2.5°". Haze is due to the inhomogeneity of a material, such as the float glass, polymer aerogel and low-e coating. Based on the calculations, the polymer aerogel of the present disclosure have haze equal to approximately 2% or less when the formation of pores greater than approximately 8 nm are suppressed. This also leads to a visible transmittance greater than approximately 95% and color-rendering index Ra greater than approximately 0.9. The pore size which leads to the above optical properties also leads to the desired thermal properties. An initial polymer aerogel transparent thermal barrier was synthesized. The synthesis was performed in the following steps: (a) polymerizing acrylate monomers in an homogeneous solution of dimethylformamide (DMF) and azobisisobutyronitrile (AIBN) initiator at 70° C.; (b) washing with DMF, acetone and acetone:diethyl ether (1:1) and (c) functionalization with chlorotrimethylsilane which makes the aerogel hydrophobic. The latter step enabled the aerogel to dry in an ambient atmosphere, without the pore walls collapsing during solvent evaporation.

One of the advantages of using polymers for the aerogel material is that they are readily stabilized by incorporating additives and/or functional groups to mitigate their aging. For instance, while polymethylmethacrylate (PMMA) tends to turn yellow after long-term exposure to sunlight, readily available additives such as the TINUVIN® series from BASF can be used to stabilize the optical properties. The effect of humidity can be mitigated by incorporating hydrophobic functions into the polymer structure. Incorporation of hydrophobic functions also allows the drying step to be performed at ambient conditions. If superior hydrophobicity is required, fluorinated functional groups, which are notoriously hydrophobic, are incorporated in the polymer.

Young's modulus of the polymer aerogel determines the deformation of the glass pane under mechanical loading, the yield strength and tensile strength which determine if the polymer aerogel will be damaged by deformations of the glass pane; the toughness which determines if the polymer barrier could improve the window's resistance to shatter for additional safety and the hardness which determines the resistance to abrasion. These mechanical properties are modeled with homogenization schemes. Acoustic properties are assessed using an acoustic impedance model for porous media, as available in the Acoustic module of COMSOL.

Process conditions that affect the morphology of polymer aerogels include: the monomer, solvent, polymerization initiator, additives, reaction pH, reaction temperature, solvent evaporation conditions and post-synthesis treatments.

As to the optimization of the polymerization and drying steps, includes parameters that are varied to achieve such optimization. In one embodiment the optimal synthetic conditions, are determined by use of Design-of-Experiments (DOE).

Having described various characteristics of the synthesizing of a polymer aerogel having specific characteristics, set forth below are alternatives having additional details for such construction.

Another objective is to scale up the aerogel synthesis from the laboratory scale to the industrial scale while preserving the optical and thermal properties. Successful scale-up of the reaction scheme illustrated in FIG. 2 requires synthesizing the aerogel without hazardous, costly, or time-consuming methods. For instance, it is preferable to use aqueous rather than organic solvents, and to perform the drying step under ambient conditions rather than by supercritical drying.

The manufacturing process of the transparent thermal barrier is a continuous roll-to-roll system capable of fabricating rolls of meter square samples, large-area thermal barrier samples and a 39"×39" (1000×1000 mm2) window unit with a ¼" thick window.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of forming an energy efficient window pane, the method comprising:
    providing a plate of glass having a first side and a second side;
    forming a polymer aerogel thermal barrier having a first side and a second side, the forming comprising
        stable free radical polymerization (SFRP) using stable nitroxide radicals; and
        associating at least one of the first side and the second side of the polymer aerogel thermal barrier with at least one of the first side and the second side of the plate of glass.

2. The method according to claim 1 wherein the aerogel comprises a polymer backbone comprising OH groups; and wherein the aerogel is further rendered hydrophobic by treatment with chloro trimethyl silane and higher hydrocarbon substituted chloro silane analogues.

3. The method of claim 1, wherein the polymer aerogel includes pores having an average pore size in the range of from about 2 nm to about 50 nm.

4. The method of claim 1, wherein the polymer aerogel includes pores having an average pore size in the range of from about 3 nm to about 20 nm.

5. The method of claim 1, wherein the polymer aerogel includes pores having an average pore size in the range of from about 5 nm to about 8 nm.

6. A method for forming a polymer aerogel comprising:
    stable free radical polymerization (SFRP) using stable nitroxide radicals.

7. The method of claim 6, wherein the aerogel comprises a polymer backbone comprising OH groups; and wherein the aerogel is further rendered hydrophobic by treatment with chloro trimethyl silane and higher hydrocarbon substituted chloro silane analogues.

8. The method of claim 6, wherein the polymer aerogel includes pores having an average pore size in the range of from about 3 nm to about 20 nm.

9. The method of claim 6, wherein the polymer aerogel includes pores having an average pore size in the range of from about 5 nm to about 8 nm.

* * * * *